United States Patent [19]

Wu

[11] 4,261,656

[45] Apr. 14, 1981

[54] OPTICALLY CLEAR ARTICLES INCORPORATING PROTECTIVE PLASTIC COATINGS

[75] Inventor: Shy-Hsien Wu, Horseheads, N.Y.

[73] Assignee: Corning Glass Works, Corning, N.Y.

[21] Appl. No.: 19,657

[22] Filed: Mar. 12, 1979

[51] Int. Cl.³ ............................ G02B 5/23; G02B 5/30; G02C 7/10

[52] U.S. Cl. .................................. 351/163; 350/398; 350/354; 351/166

[58] Field of Search ............... 351/159, 163, 166, 165; 350/155

[56] References Cited

U.S. PATENT DOCUMENTS

| | | | |
|---|---|---|---|
| 2,263,249 | 11/1941 | Rogers | 351/163 X |
| 3,653,863 | 4/1972 | Araujo et al. | 65/37 X |
| 3,833,289 | 9/1974 | Schuler | 351/166 X |
| 3,862,261 | 1/1975 | Stoddard | 260/33.2 R |
| 3,867,235 | 2/1975 | French et al. | 351/166 X |
| 4,017,292 | 4/1977 | Mann | 65/37 X |

OTHER PUBLICATIONS

Sunchemie advertisement, *Manufacturing Optician International*, vol. 22 No. 2, Aug. 1969, p. 125.

*Primary Examiner*—John K. Corbin
*Assistant Examiner*—Scott J. Sugarman
*Attorney, Agent, or Firm*—Clinton S. Janes, Jr.; Kees van der Sterre

[57] ABSTRACT

Transparent, optically clear articles comprising thin or delicate organic or inorganic surface films such as plastic polarizing films, wherein the surface films are protected from scratching and moisture damage by protective plastic coatings which are optically clear, smooth, weather-resistant and chemically compatible with the surface films, are provided.

15 Claims, 2 Drawing Figures

OPTICALLY CLEAR ARTICLES INCORPORATING PROTECTIVE PLASTIC COATINGS

BACKGROUND OF THE INVENTION

The present invention relates to optically clear articles comprising delicate surface films, e.g., thin organic or inorganic films which function as light filters, polarizers or the like. Specifically, the invention is concerned with an optically clear article comprising a thin delicate surface film, wherein at least part of the surface film is provided with a plastic coating which protects the film from the damaging effects of scratching, moisture and abrasion.

Laminated articles comprising a combination of glass and plastic laminae are well known in the art. U.S. Pat. No. 3,781,184 to Domicone et al., for example, discloses glass-plastic laminated windshields comprising an inner layer of soft polyvinyl butyral which is protected from abrasion by a polyvinyl fluoride film. U.S. Pat. No. 3,808,077 to Rieser et al., discloses glass-plastic laminated articles for vehicle windshields comprising polyvinyl acetal or polyurethane layers which may optionally be protected with thin plastic films.

In the ophthalmic field, many attempts to combine the desirable properties of glasses and plastics are found in the patent literature. German Auslegeschrift No. 1,284,588 describes photochromic composites comprising photochromic glass and plastic layers, while German Gebrauchsmuster No. 1,985,755 discloses glass-glass composites for ophthalmic lenses which comprise a polarizing film interlayer.

As noted in the prior art, a major problem relating to glass articles comprising an exposed delicate film, composed for example of a soft organic material such as plastic, is that of protecting the delicate film from damage due to scratching or moisture. By a delicate film is meant an organic or inorganic film exhibiting low resistance to damage from scratching, abrasion, or moisture. Examples include polymeric plastic films such as polyvinyl butyral, polyvinyl alcohol, or polyvinyl chloride, inorganic photochromic films such as silver halide layers, and also organic or inorganic dye layers deposited alone or in combination with temporary or permanent organic underlayers or carrier films.

In the field of protective coatings, a great deal of attention has been directed to the development of coating compositions which may be applied to glass articles such as glass containers, to protect them from scratching damage (which can impair strength), or to glass lenses to impart properties such as fogging resistance or the like thereto. Hence, Netherlands Patent Application No. 72.16492 describes acrylic-melamine-silane coatings for glass lenses or the like which protect against surface condensation, while German Patent Application No. 2,732,062 discloses two-layer protective coatings such as polyester/acrylic coatings, for protecting glass bottles from damage.

The problem of protecting delicate films from scratching and moisture damage is quite different from that of protecting glass containers from such damage. In the former instance, the protective coating must be disposed on a delicate base, rather than a hard inert inorganic base, a factor which can increase the vulnerability of the coating to damage by scratching point loads. Also, the protective coating must exhibit good bonding and chemical compatibility with the delicate film itself, rather than with a glass surface, and must exhibit a high degree of moisture resistance, optical clarity, smoothness and weatherability. Finally, the coating must be inexpensive and relatively simple to apply.

Hard or brittle coatings which offer good abrasion resistance on hard plastic or glass substrates may not be suitable for use in protecting delicate films of the kind above described. Hence, amino resin coatings such as melamine coatings, or coatings composed of silicates or vacuum-deposited silica, are too brittle for use on soft organic films and crack easily under scratching point loads. Such coatings can also crack in the event of swelling of the underlying film, which can occur in the presence of moisture. On the other hand, many of the softer coatings (e.g. polyurethane or silicone coatings) which can effectively protect glass containers from scratching damage, are readily torn by point loads when disposed as thin (e.g. not exceeding about 2 mils in thickness) layers on soft organic underlayers.

It is therefore a principal object of the present invention to provide a transparent, optically clear article comprising a delicate organic or inorganic surface film wherein the film is protected from moisture, scratching and abrasion damage by a thin protective plastic coating as hereinafter described.

It is a further object of the present invention to provide an optically clear glass article comprising a light-polarizing surface film wherein the light polarizing surface film is protected from moisture, scratching or abrasion damage by a thin protective plastic coating as hereinafter described.

It is a further object of the invention to provide an optically clear glass article comprising a light-polarizing surface film which is suitable for use as an ophthalmic lens, wherein the surface film is protected by a thin protective plastic coating and wherein the glass is a photochromic glass which reversibly darkens on exposure to light.

Other objects and advantages of the invention will become apparent from the following description thereof.

SUMMARY OF THE INVENTION

In accordance with the present invention, there is provided a transparent, optically clear article comprising a glass or plastic base element supporting a thin delicate organic or inorganic surface film, wherein at least a portion of the surface film is protected from moisture, scratching and abrasion by a protective plastic coating. The hardness of the protective coating is controlled to avoid excessive flexibility or brittleness, so that good scratch resistance, even over a relatively soft film, is obtained. The coating exhibits good chemical compatibility with the underlying film and imparts excellent moisture resistance to the layered system.

The protective coating provided on the thin film may be selected from one of two coating systems; one of these systems comprises a single coating layer, and the other is a two-layer system. These coating systems may be characterized as follows;

(a) a one-layer coating composed of a cured melamine-modified acrylic resin;

(b) a two-layer coating having a base layer and a covering layer, the base layer being bonded to the thin film and being composed of a polyester resin, and the covering layer being bonded to the base layer and being composed of a cured melamine-modified acrylic resin.

In a specific preferred embodiment, the invention includes an optically clear, polarizing photochromic ophthalmic lens comprising a photochromic glass lens element, a light-polarizing film bonded to the glass element, and a protective coating covering at least part of the light polarizing film, that coating being selected from one of the two coating systems above described. This lens effectively combines the properties of fatigue-free photochromic behavior (characteristic of photochromic glasses) with the efficient polarizing properties of thin films. Through the use of the described protective coatings, the physical and chemical durability which are essential to a commercially viable optical or ophthalmic product are obtained.

BRIEF DESCRIPTION OF THE DRAWING

The invention may be further understood by reference to the DRAWING, wherein.

DETAILED DESCRIPTION

Figure 1:
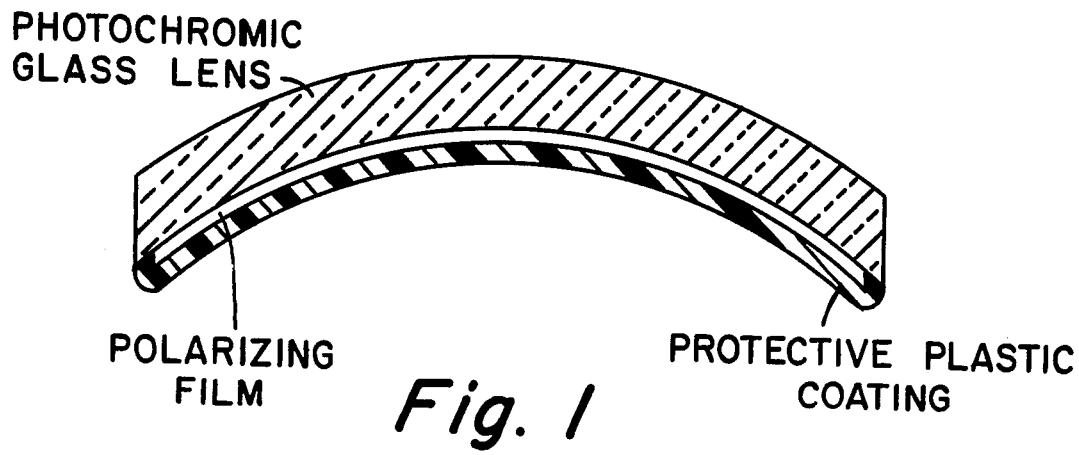
FIG. 1 is a schematic illustration in cross-section, not in true proportion, of a photochromic glass lens supporting a delicate polarizing film and provided with a protective plastic coating.
Figure 2:
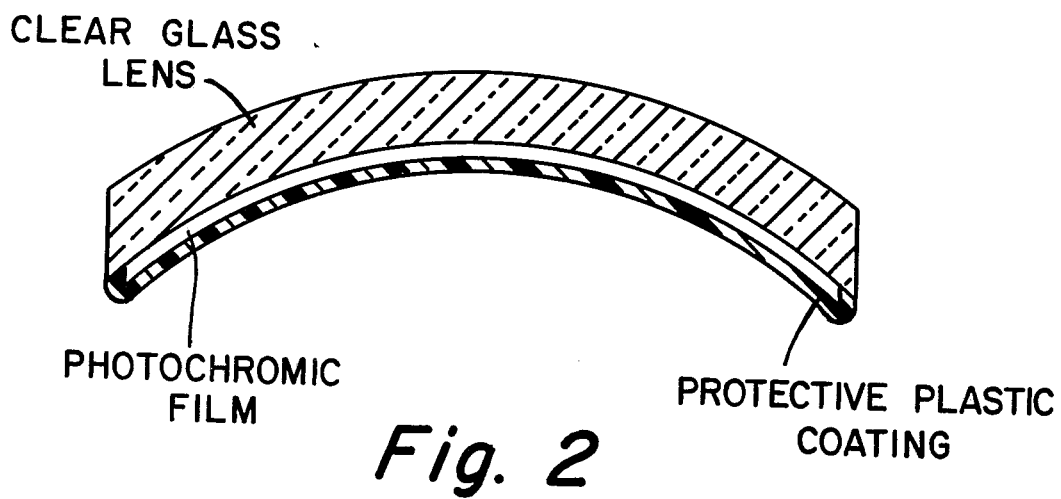
FIG. 2 is a schematic illustration in cross-section, not in true proportion, of a clear glass lens supporting a delicate photochromic film and provided with a protective plastic coating.

In a broad sense, glass or clear plastic articles to be provided with protective coatings in accordance with the invention may be of essentially any configuration or structure, sharing only the common feature of a delicate organic or inorganic surface film or layer imparting light-modifying characteristics or other useful physical properties to the articles. Hence, multi-layer laminates comprising several glass and plastic layers, as well as glass or plastic articles having one or both surfaces covered with thin delicate surface films, may be coated as herein described.

Surface films of interest for transparent articles according to the invention are typically thin (0.1-10 mils) light-modifying films such as polarizing films, tinted films or photochromic films. These may be composed of soft plastics, dyes, or inorganic layers such as silver halides, but are in all cases delicate in the sense of being highly vulnerable to damage from moisture or abrasion.

Protective coatings provided in accordance with the invention are chemically compatible with inorganic silver halide films and also with many of the soft plastics which have been used to provide polarizing surface films on glass, including, for example, polyvinyl butyral, polyvinyl alcohol, polyvinyl chloride and the like. Hence, in addition to a proper degree of hardness (which is necessary for good scratch resistance) and low moisture permeability, such coatings provide good bonding yet resist excessive chemical interaction with these delicate organic and inorganic films, so that blistering, haze or other visible interface defects are avoided. Chemical compatibility is critical, particularly for applications involving optical or ophthalmic lenses, since in such cases optical clarity is an indispensible characteristic of the protectively coated product.

In the case of optically clear, polarizing photochromic ophthalmic lenses, the photochromic glass lens element may be composed of any of the well-known photochromic glasses which exhibit the properties of darkening on exposure to actinic radiation and fading in the absence thereof. Thicknesses for the photochromic glass lens element to be coated are typically within the range of about 1-3 millimeters, although thicker or thinner glass elements may also be employed.

Photochromic glass lens elements may be free-sagged elements or ground and polished prescription lens blanks, a typical example of the latter being PHOTOGRAY® glass photochromic lens blanks, commercially available from Corning Glass Works, Corning, New York. Of course, in cases where photochromic properties are not desired in the polarizing lens, lens blanks composed of ordinary ophthalmic glass, known in the art as white crown glass, may alternatively be employed.

Although any of the commercially available polarizing films may be utilized in the production of polarizing photochromic ophthalmic lenses, films which are preferred for the present purpose are those having good polarizing efficiency in thin cross-section, e.g., a thickness in the range of about 0.1-10 mils. A specific example of a suitable plastic film is polarizing polyvinyl butyral which is commercially available as thin, preformed sheet. Other examples of suitable films include the so-called Beilby layer polarizers, which are films incorporating oriented dichoric dye layers produced by depositing suitable dichroic dye molecules on a prepared substrate. The substrate may be a glass or plastic base or a flexible plastic carrier. Both types of films may be quite thin and, in unprotected form, are easily scratched, resulting in highly visible scratch marks exhibiting poor polarizing efficiency. They are also vulnerable to moisture damage, exhibiting swelling, fading and/or loss of polarizing efficiency upon contact with water.

Compositions suitable for providing protective plastic coatings in accordance with the invention may be formulated on a batch or continuous basis, using commercially available acrylic, melamine and polyester resins. Alternatively, commercially available formulations may be used. However, careful composition selection is required in order retain low moisture permeability while insuring a proper level of hardness for scratch resistance and abrasion resistance. In addition, composition control is required to insure good bonding and chemical compatibility with delicate films. Both are necessary to insure freedom from coating blistering and haze in the coated product. The curing of these resin formulations to provide protective coatings is accomplished by polymerization and/or crosslinking according to conventional methods, which may include the use of polymerization or cross linking catalysts, heat, or ultraviolet radiation.

The method of applying the resin formulation to the delicate film is not critical; dipping, spraying, brushing or other well known coating techniques may be employed. However, precision spraying is the preferred method from the standpoint of coating uniformity and thickness control. The thickness of the resin coating to be applied by such methods will vary according to the intended use of the coated product; however, for ophthalmic lens applications, coating thicknesses in the range of about 0.5-3.0 mils are ordinarily preferred.

Describing the protective coating system in more detail, cured melamine-modified acrylic resins useful for one-layer coatings are acrylic resins modified by the addition of controlled amounts of alkylated melamine resins, also referred to as alkylated melamine-formaldehyde resins. Examples of such resins are methylated melamine and butylated melamine resins.

A preferred resin for one-coat systems contains 3–10 parts by weight of butylated melamine-formaldehyde resin for each 100 parts by weight of acrylic resin, the butylated melamine-formaldehyde resin acting as a cross-linking and bonding agent. A specific example of the use of this coating system is as follows:

EXAMPLE 1

A melamine-modified acrylic resin is provided by combining 5 parts by weight of a melamine resin, specifically a butylated melamine-formaldehyde resin, commercially available as Amino Resin 70-10 from the Koppers Company, Inc., Pittsburgh, Pennsylvania, with 100 parts by weight of acrylic resin, commercially available as 326L acrylic resin from E. I. duPont de Nemours & Company, Inc., Wilmington, Delaware. To this resin blend is added 0.44 parts by weight of an acid catalyst, commercially available as 4040 acid catalyst from American Cyanamid Company, Wayne, New Jersey.

A glass-plastic polarizing photochromic ophthalmic lens is provided for coating. This lens is a ground and polished lens about 2 mm. in thickness which is composed of PHOTOGRAY ® photochromic glass. Disposed on this lens is a delicate polarizing film about 0.5 mils in thickness consisting of a soft plastic polyvinyl butyral layer.

A coating of the catalyzed melamine-modified acrylic resin prepared as above described in applied to the polyvinyl butyral film on the lens by spinning to provide a coating approximately 1 mil in thickness. This coating completely covers all exposed surfaces of the polarizing polyvinyl butyral film.

The resin coating thus provided is cured by heating the lens at 70° C. for one hour to form a clear, hard but not brittle plastic coating on the soft plastic film. The desirable properties of this coating are attributed partly to the butylated melamine-formaldehyde resin, which promotes bonding between the protective coating and the polyvinyl butyral film, yet does not introduce adverse effects such as haze or wet film blistering. Thus a coated lens of excellent optical quality is provided. It is found that the protected polarizing film is highly resistant to damage by scratching and moisture, and exhibits a polarizing efficiency equal to that of the unprotected film. A schematic illustration, not to scale, of a lens provided in accordance with the example is shown in the DRAWING.

The melamine-modified acrylic resin formulation produced as described may also be applied to a commercial Beilby layer polarizing film comprising an oriented dichroic dye layer, such as, for example, a film about 0.5 mils in thickness of the type used in Polacoat ™ polarizing filters, which are commercially available from the 3M Company, Minneapolis, Minnesota. Excellent scratch protection and moisture resistance are imparted to this film by this coating formulation, and no losses in polarizing efficiency or optical quality are incurred in the coating process.

As previously noted, two-layer coating systems useful for protecting delicate films on glass or plastic in accordance with the invention include, in addition to a base polyester layer, a covering layer composed of a cured melamine-modified acrylic resin. As in the one-coat system, this modified acrylic resin is an acrylic resin modified by the addition of an alkylated melamine resin such as a butylated or methylated melamine resin. The modified acrylic resin described above for one-layer coatings, containing 3–10 parts by weight of butylated melamine resin for each 100 parts by weight of acrylic resin is an example of such a resin.

An alternative and preferred modified acrylic resin for use in two-layer coatings is an acrylic resin modified by the addition of a methylated melamine resin, most preferably a hexa(methoxymethyl) melamine resin. Such systems are exemplified by formulations containing 3–35 parts by weight of hexa(methoxymethyl) melamine resin for each 100 parts by weight of acrylic resin, preferably 15–25 parts by weight of hexa(methoxymethyl) melamine resin for each 100 parts by weight of acrylic resin.

Specific examples of the use of such modified acrylic resins in two-layer coating systems are as follows:

EXAMPLE 2

A melamine-modified acrylic resin consisting of an acrylic resin containing a hexa(methoxymethyl) melamine modifier is provided by combining 100 parts by weight of acrylic resin, commercially available as the 326L acrylic resin above described, with 20 parts by weight of a hexa(methoxymethyl) melamine resin, commercially available as Cymel 303 resin from American Cyanamid. To this resin blend is added 0.63 parts by weight of an acid catalyst, commercially available as the 4040 acid catalyst described in Example 1 above.

A polarizing photochromic ophthalmic lens having the configuration of the lens described in Example 1 is provided for coating. To provide a 2-layer protective coating on this lens, a one mil-thick base layer of a polyester resin, commercially available as 49000 resin from E. I. duPont, is provided on the exposed polarizing polyvinyl butyral film on the glass lens by spinning. This base polyester layer is cured by heating at 70° C., first at atmospheric pressure for ½ hour and then under a partial vacuum (28 inches of mercury) for ½ hour.

A coating of the catalyzed melamine-acrylic resin prepared as above described is then applied over the polyester base layer by spinning to provide a covering layer about 1 mil in thickness. This second resin layer is then cured by heating at 70° C. for 1 hour.

The product of the coating process is a two-layer protective plastic coating exhibiting excellent scratch and moisture resistance and excellent bonding to the polyvinyl butyral polarizing film. The tough polyester base layer imparts good scratch resistance to the coating system and excellent bonding to the polarizing film, while the covering melamine-acrylic layer superimposes excellent abrasion resistance and good stability in the presence of moisture. The hardness of the modified acrylic layer imparts superior scratch and abrasion resistance to this two-layer coating, making it the preferred protection system for lenses in accordance with the invention.

The two-layer coating of the Example may also be applied to a glass-supported polarizing film comprising an oriented dichroic dye layer, such as a glass sheet supporting a Polacoat ™ polarizing film, and is found to impart excellent scratch resistance and moisture protection to the polarizing film.

EXAMPLE 3

The melamine-modified acrylic resin described in Example 2 is also suitable for use in a one-layer coating system. Hence a coating of the catalyzed melamine acrylic resin prepared as described in Example 2 is applied to a section of glass sheet supporting a Polacoat ™ polarizing film by spinning to provide a covering layer about 1 mil in thickness thereon. This coating is then cured by heating at 70° C. for 1 hour.

Excellent scratch protection and moisture resistance are imparted to the polarizing film by this coating, and no losses in polarizing efficiency or optical quality are incurred in the coating process. However, this coating system is not as desirable for use with polyvinyl butyral or similar films, since optical clarity may be adversely affected by film interactions with the hexa(methoxymethyl) melamine component of the coating formulation.

EXAMPLE 4

A two-layer protective coating is applied to a polarizing photochromic ophthalmic lens in substantial accordance with the procedure described in Example 2, except that, in place of the modified acrylic resin used to provide the covering layer in Example 2, a covering layer composed of the modified acrylic resin utilized to provide the one-layer coating of Example 1 is employed. Hence, the covering layer consists of a butylated melamine-modified acrylic resin rather than a methylated melamine-modified acrylic resin, although the same base layer of polyester resin is employed.

This two-layer protective coating imparts excellent scratch resistance and moisture resistance to the polarizing polyvinyl butyral film used on this ophthalmic lens. It also effectively protects Polacoat ™ polarizing films of the type described in Example 1, when applied to glass-supported films in the manner above described. However, it is somewhat less desirable than the coating of Example 2 with respect to scratch and abrasion resistance, due to slightly lower hardness in the acrylic layer.

In order to test the moisture resistance and scratch resistance of polarizing ophthalmic lenses provided with protective coatings as above described, such lenses are subjected to standard scratch and moisture tests which have been devised to evaluate the physical properties of plastic coating materials. In accordance with a test for scratch resistance, a polarizing lens provided with a protective coating is evaluated using a Taber Shear/Scratch Tester wherein a conical diamond point (encompassing a 90° included angle and with a 3-mil point radius) is drawn across the protectively coated lens under increasing load until scratching sufficient to affect the polarizing efficiency of the polarizing film is observed.

As representative of the scratch resistance exhibited by protectively coated polarizing lenses provided in accordance with the foregoing examples, the following Table sets forth typical scratch test data for selected lenses incorporating 0.5 mil polarizing polyvinyl butyral films and provided with certain of the protective coatings described in the examples. Included in the Table are an identification of the protective coating, an indication of the protective coating thickness, and the conical point loading in grams of weight necessary to penetrate the protective coating and impair the polarizing effectiveness of the underlying polarizing polyvinyl butyral film. Also included are results for an identical lens supporting a polarizing polyvinyl butyral film, but having no protective coating.

TABLE

| Coating System | Coating Thickness | Scratching Load at Failure (grams) |
|---|---|---|
| No protective coating | — | <100 grams |
| One-layer: butylated melamine-modified acrylic (Example 1) | 1 mil | 650 grams |
| Two-layer: polyester base; butylated melamine-modified acrylic cover (Example 4) | 2 mils | 800 grams |
| Two-layer: polyester base; hexa(methoxymethyl) melamine-modified acrylic cover (Example 2) | 2 mils | ≧800 grams |

The substantial improvement in film scratch resistance imparted by these protective coatings is readily apparent from the above data.

To evaluate the moisture-resistant properties of protective coatings, an accelerated moisture resistance test is used which comprises immersing protectively coated lenses into hot (60° C.) water for a 30-minute exposure interval, and thereafter evaluating the lenses for haze and changes in color and polarizing efficiency which result from the test. In many cases, problems relating to coating compatibility with the protected film, such as blistering or debonding, are also indicated by this test.

In the case of unprotected polarizing films, whether of the preformed plastic sheet or dichroic dye layer type, a high degree of haze together with significant color change (fading) and loss of polarizing efficiency are incurred in the accelerated moisture test. In contrast, protectively coated polarizing films prepared in accordance with any of Examples 1–4 above exhibit no increase in haze, no fading or loss in polarizing efficiency, and no coating compatibility problems resulting in blistering or debonding.

The foregoing results clearly indicate the desirable combination of scratch resistance and moisture resistance exhibited by protectively coated glass or plastic articles comprising delicate polarizing or other light-filtering organic or inorganic films in accordance with the invention. Additional features of such protectively coated articles or lenses are excellent optical clarity and smoothness, good weatherability, and freedom from interface defects attributable to chemical interactions between the underlying film and the protective coating.

It will of course be recognized that the foregoing examples are merely illustrative of lenses and other transparent glass or plastic articles which may be provided according to the invention; obviously modifications of these articles may be carried out within the scope of the invention as defined by the appended claims. For example, the described protective coatings are excellent dye receptors, and may be readily tinted in accordance with techniques known to the art. Thus a tinted, protectively coated polarizing photochromic glass article constitutes a particularly useful embodiment of the invention for commercial applications such as sunglasses, windshields or the like. Other modifications of the articles hereinabove described may similarly be developed for particular applications within the scope of the appended claims.

I claim:

1. A transparent, optically clear article comprising a base element consisting of glass or plastic and a thin organic or inorganic surface film supported on the base element, wherein the thin surface film is protected from scratching and moisture by a protective plastic coating at least partially covering said film, said protective coating being selected from the group consisting of:
   (a) a one-layer coating consisting essentially of a cured melamine-modified acrylic resin; and
   (b) a two-layer coating having a base layer bonded to the surface film and a covering layer bonded to the base layer, the base layer consisting essentially of a polyester resin and the covering layer consisting essentially of a cured melamine-modified acrylic resin.

2. A transparent, optically clear polarizing ophthalmic lens comprising a glass element supporting a light-polarizing surface film and a protective coating covering at least part of the surface film, said protective coating being selected from the group consisting of:
   (a) a one-layer coating consisting essentially of a cured melamine-modified acrylic resin; and
   (b) a two-layer coating having a base layer bonded to the surface film and a covering layer bonded to the base layer, the base layer consisting essentially of a polyester resin and the covering layer consisting essentially of a cured melamine-modified acrylic resin.

3. A polarizing ophthalmic lens in accordance with claim 2 wherein the glass element is composed of white crown glass.

4. A polarizing ophthalmic lens in accordance with claim 2 wherein the cured melamine-modified acrylic resin consists essentially of an acrylic resin modified by the addition of an alkylated melamine resin.

5. A polarizing ophthalmic lens in accordance with claim 2 which exhibits photochromic properties, the glass element of the lens being composed of photochromic glass.

6. A polarizing photochromic ophthalmic lens in accordance with claim 5 which comprises a one-layer coating consisting essentially of a cured melamine-modified acrylic resin comprising 3-10 parts by weight of butylated melamine resin for each 100 parts by weight of acrylic resin.

7. A polarizing photochromic ophthalmic lens in accordance with claim 5 which comprises a two-layer coating wherein the covering layer consists essentially of a cured melamine-modified acrylic resin comprising 3-10 parts by weight of butylated melamine resin for each 100 parts by weight of acrylic resin.

8. A polarizing photochromic ophthalmic lens in accordance with claim 5 which comprises a two-layer coating wherein the covering layer consists essentially of a cured melamine-modified acrylic resin comprising 3-35 parts by weight of hexa(methoxymethyl) melamine resin for each 100 parts by weight of acrylic resin.

9. A polarizing photochromic ophthalmic lens in accordance with claim 8 wherein the cured melamine-modified acrylic resin comprises 15-25 parts by weight of hexa(methoxymethyl) melamine resin for each 100 parts by weight of acrylic resin.

10. A polarizing photochromic ophthalmic lens in accordance with claim 5 wherein the light-polarizing surface film is formed of preformed polarizing plastic sheet.

11. A polarizing photochromic ophthalmic lens in accordance with claim 10 wherein the light-polarizing surface film is formed of preformed polyvinyl butyral sheet.

12. A polarizing photochromic ophthalmic lens in accordance with claim 5 wherein the light-polarizing surface film includes an oriented dichroic dye layer.

13. A polarizing photochromic ophthalmic lens in accordance with claim 12 wherein the protective coating is a one-layer coating consisting essentially of a cured melamine-modified acrylic resin comprising 15-25 parts by weight of hexa(methoxymethyl) melamine resin for each 100 parts by weight of acrylic resin.

14. A transparent optically clear article in accordance with claim 1 wherein the protective coating is tinted.

15. A transparent, optically clear photochromic ophthalmic lens comprising a glass element composed of non-photochromic glass supporting a photochromic surface film and a protective coating covering at least part of the surface film, said protective coating being selected from the group consisting of:
   (a) a one-layer coating consisting essentially of a cured melamine-modified acrylic resin; and
   (b) a two-layer coating having a base layer bonded to the surface film and a covering layer bonded to the base layer, the base layer consisting essentially of a polyester resin and the covering layer consisting essentially of a cured melamine-modified acrylic resin.

* * * * *